United States Patent
Katsifolis et al.

(10) Patent No.: US 7,499,177 B2
(45) Date of Patent: Mar. 3, 2009

(54) APPARATUS AND METHOD FOR USING A COUNTER-PROPAGATING SIGNAL METHOD FOR LOCATING EVENTS

(75) Inventors: Jim Katsifolis, Northcote (AU); Lee J. McIntosh, Stockholm (SE)

(73) Assignee: Future Fibre Technologies Pty Ltd, Mulgrave VIC (AU)

( * ) Notice: Subject to any disclaimer, the term of this patent is extended or adjusted under 35 U.S.C. 154(b) by 0 days.

(21) Appl. No.: 12/178,997

(22) Filed: Jul. 24, 2008

(65) Prior Publication Data

US 2008/0291462 A1 Nov. 27, 2008

Related U.S. Application Data

(63) Continuation of application No. 11/311,009, filed on Dec. 19, 2005, now abandoned.

(30) Foreign Application Priority Data

Jan. 11, 2005 (AU) .............................. 2005900109

(51) Int. Cl.
*G01B 9/02* (2006.01)
(52) U.S. Cl. ........................ 356/483; 356/493
(58) Field of Classification Search .................. 356/483, 356/491, 493
See application file for complete search history.

(56) References Cited

U.S. PATENT DOCUMENTS

| | | |
|---|---|---|
| 4,848,906 A | 7/1989 | Layton |
| 4,885,462 A | 12/1989 | Dakin |
| 4,897,543 A | 1/1990 | Kersey |
| 4,898,468 A | 2/1990 | Udd |
| 4,915,503 A | 4/1990 | Pavlath |
| 4,976,507 A | 12/1990 | Udd |
| 5,046,848 A | 9/1991 | Udd |
| 5,206,923 A | 4/1993 | Karlsson |
| 5,311,592 A | 5/1994 | Udd |
| 5,402,231 A | 3/1995 | Udd |

(Continued)

FOREIGN PATENT DOCUMENTS

FR 2 753 530 3/1998

(Continued)

OTHER PUBLICATIONS

Chapter 10 and 11 from Eric Udd, "Fiber Optic Sensors: An Introduction for Engineers and Scientists", 1991, John Wiley and Sons, ISBN 0-471-83007-0.

(Continued)

*Primary Examiner*—Patrick J Connolly
(74) *Attorney, Agent, or Firm*—Michael Best & Friedrich LLP (57) ABSTRACT

An apparatus and method for using a counter-propagating signal method for locating events is disclosed. The apparatus and method uses a Mach Zehnder interferometer through which counter-propagating signals can be launched. If the sensing zone of the Mach Zehnder interferometer is disturbed, modified counter-propagating signals are produced, and the time difference between receipt of those signals is used to determine the location of the event. Polarisation controllers receive feedback signals so that the polarisation states of the counter-propagating signals can be controlled to match the amplitude and/or phase of the signals. Detectors are provided for detecting the modified signals.

14 Claims, 10 Drawing Sheets

U.S. PATENT DOCUMENTS

| | | |
|---|---|---|
| 5,455,698 A | 10/1995 | Udd |
| 5,473,459 A | 12/1995 | Davis |
| 5,636,021 A | 6/1997 | Udd |
| 5,694,114 A | 12/1997 | Udd |
| 6,490,045 B1 | 12/2002 | Dakin et al. |
| 6,600,586 B1 | 7/2003 | Hall |
| 6,621,947 B1 | 9/2003 | Tapanes et al. |
| 6,778,717 B2 | 8/2004 | Tapanes et al. |
| 2005/0147341 A1* | 7/2005 | Patel et al. .......... 385/12 |
| 2005/0276611 A1 | 12/2005 | Patel et al. |
| 2006/0163457 A1* | 7/2006 | Katsifolis et al. ...... 250/227.14 |
| 2008/0191126 A1* | 8/2008 | Adams et al. .......... 250/227.19 |
| 2008/0291462 A1* | 11/2008 | Katsifolis et al. .......... 356/483 |

FOREIGN PATENT DOCUMENTS

| | | |
|---|---|---|
| GB | 1 497 995 | 1/1978 |
| GB | 2204204 | 11/1988 |
| JP | 10-148654 | 6/1998 |
| JP | 10160635 | 6/1998 |
| JP | 2000-048269 | 2/2000 |

OTHER PUBLICATIONS

Kersey A. D., Marrone M. J., Dandridge A., and Tveten A. B., "Optimization and Stabilization of Visibility in Interferometric Fiber-Optic Sensors Using Input Polarization Control", Journal of Lightwave Technology, vol. 16, No. 10, Oct. 1988, pp. 1599-1609.

Declaration of Jim Katsifolis, PH.D.

PCT search report PCT/AU2005/001899 for international publication WO 2006/074502.

* cited by examiner

APPARATUS AND METHOD FOR USING A COUNTER-PROPAGATING SIGNAL METHOD FOR LOCATING EVENTS

RELATED APPLICATION

This application is a continuation of copending U.S. patent application Ser. No. 11/311,009, filed Dec. 19, 2005, the entire content of which is incorporated herein by reference.

FIELD OF THE INVENTION

This invention relates to a method and apparatus for locating events, such as intrusions into a secured premises, or breakdown or other events associated with structures, so that the location of the event can be determined.

BACKGROUND OF THE INVENTION

Apparatus and method for locating events are disclosed in our U.S. Pat. Nos. 6,621,947 and 6,778,717. The contents of these two patents are incorporated into this specification by this reference.

The system used in the above-identified U.S. patents utilises a Mach Zehnder (MZ) interferometer in which counter-propagating signals are provided. By measuring the time difference of perturbed signals caused by an event, the location of the event along the sensing device formed by the Mach Zehnder interferometer can be determined.

Thus, when an event perturbs the MZ sensor portion of the system, the difference in the arrival time of the counter-propagating signals at the detectors can be used to calculate the exact location of the perturbation on the MZ sensor. This type of sensor can be applied to perimeter or infrastructure security applications, with typical sensing lengths exceeding 50 km.

SUMMARY OF THE INVENTION

The object of the invention is to improve the system and method disclosed in the above-identified patents so that a more exact location of the event can be provided.

The invention provides an apparatus for detecting and locating disturbances, comprising:

at least one light source;

an optical system with at least one optical waveguide, the optical waveguide having at least one detection zone at which a disturbance can occur and affect optical signals from the light source when traveling through the waveguide, in the detection zone, along counter-propagating optical channels;

at least one beam separator between the light source and the optical system, wherein the beam separator couples at least two beams into the optical waveguide for each of the at least two counter-propagating optical channels;

at least one polarization controller operable to manage optical properties of said counter-propagating optical channels, the polarization controller adjusting optical properties for at least one of the optical signals when propagating toward the detection zone;

at least one detector coupled to the optical waveguide and responsive to the optical signals after traversing the detection zone;

a data processing unit coupled to the detector, the data processing unit being operable to localize a place of the disturbance in the detection zone from a difference between times at which effects of the disturbance appear at the detector; and, a feedback control coupled to the optical system and to at least one said polarization controller, wherein the feedback control and the polarization controller are configured to maximize a signal-to-noise ratio and to minimize a polarization contribution to said difference between times, by at least one of: seeking a predetermined relationship between polarization phase transformations along the counter-propagating optical channels, maximizing a peak swing in intensity at a point of interference of the beams, and varying an input state of polarization for one of testing and adjusting a balance between said polarization transformations for the counter-propagating channels.

The invention also provides a method for detecting and locating disturbances, comprising:

establishing an optical system including at least one optical waveguide extending along at least one detection zone at which a disturbance can occur, so as to affect optical signals propagating along counter-propagating optical channels from at least one light source to a detector;

separating from the at least one light source, and coupling into each of the counter-propagating optical channels, at least two beams;

managing optical properties in the counter-propagating optical channels using a polarization controller to vary optical properties for at least one of the optical signals while propagating toward the detection zone;

detecting the optical signals after traversing the detection zone and determining a difference between times at which effects of the disturbance appear in the respective counter-propagating channels after traversing said detection zone;

calculating from said difference between times and localizing in the detection zone a place where the disturbance occurred;

wherein said managing of the optical properties comprises providing a control signal to the polarization controller that maintains a signal-to-noise ratio and minimizes a contribution to said difference between times caused by polarization effects, including at least one of:

seeking a predetermined relationship between polarization phase transformations along the counter-propagating optical channels, maximizing a peak swing in intensity at a point of interference of the beams, and varying an input state of polarization for one of testing and adjusting a balance between said polarization transformations for the counter-propagating channels.

The invention also provides an improved method for detecting and locating disturbances affecting an optical system including at least one optical waveguide extending along at least one detection zone at which a disturbance can occur, thereby affecting optical signals propagating along counter-propagating optical channels from at least one light source to a detector, wherein at least two beams are separated from the at least one light source and coupled into each of the counter-propagating optical channels, and an effect of the disturbance is detected after the beams have traversed the detection zone and a time difference is determined for calculating a location of the disturbance in the detection zone, wherein the improvement comprises:

managing optical properties in the counter-propagating optical channels using a polarization controller to vary optical properties for at least one of the optical signals while propagating toward the detection zone, wherein said managing includes providing a control signal to the polarization controller that maintains a signal-to-noise ratio and minimizes a contribution to said difference between times caused by polarization effects, and comprises at least one of seeking a predetermined relationship between polarization phase transformations along the counter-propagating optical channels, maximizing a peak swing in intensity at a point of interference of the beams, and varying an input state of polarization for one of testing and adjusting a balance between said polarization transformations for the counter-propagating channels.

The invention still further provides an apparatus for locating the position of an event, comprising:

a light source;

a waveguide for receiving light from the light source so that the light is caused to propagate in both directions along the waveguide to thereby provide counter-propagating optical signals in the waveguide, the waveguide being capable of having the counter-propagating optical signals or some characteristic of the signals modified or affected by an external parameter caused by or indicative of the event to provide modified counter-propagating optical signals which continue to propagate along the waveguide;

detector means for detecting the modified counter-propagating optical signals affected by the parameter and for determining the time difference between the receipt of the modified counter-propagating optical signals in order to determine the location of the event;

a controller for controlling polarisation states of the counter-propagating optical signals so that the signals are amplitude and phase matched; and wherein the waveguide comprises a first arm for receiving the counter-propagating signals, and a second arm for receiving the counter-propagating signals, the first and second arms forming a Mach Zehnder interferometer.

By matching the amplitude and phase of the counter-propagating signals, output fringes at the detector are produced which are easily detected and therefore the time difference between receipt of the two modified counter-propagating detectors can be accurately recorded to thereby accurately determine the location of the event. This also improves the sensitivity of the system and method.

In the preferred embodiment of the invention, the input polarisation states of the counter-propagating signals are controlled to achieve maximum output fringes. However, in other embodiments, polarisation states which lead to amplitude and phase matched outputs, but with sub-maximum fringe visibilities can also be utilised.

Preferably the control unit comprises the detector means, a polarisation controller for each of the counter-propagating signals and the light source.

Preferably the detector means comprises a first detector for one of the counter-propagating signals and a second detector for the other of the counter-propagating signals.

Preferably the light source comprises a laser light source having bragg gratings and an adjuster for controlling the bragg gratings to thereby alter the wavelength of the light signal output from the laser for producing the counter-propagating signals.

Preferably the control unit includes a processor for receiving outputs from the detectors and for processing the outputs to indicate an event and to determine the location of the event.

In one embodiment the processor is coupled to a polarisation control driver and the polarisation control driver is coupled to the polarisation controllers for controlling the controllers to thereby set the polarisation of the signals supplied from the light source to the first and second arms of the Mach Zehnder interferometer to in turn set the polarisation of the counter-propagating signals.

Preferably the detectors are connected to a Mach Zehnder output monitor for monitoring the counter-propagating signals detected by the detectors so that when the modified counter-propagating detectors are detected by the detector, the MZ output determines detection of those signals by the detectors for processing by the processor.

In one embodiment of the invention the first arm of the Mach Zehnder interferometer is of different length than the second arm of the Mach Zehnder interferometer so that the first and second arms have a length mismatch, the control unit further comprising a dither signal producing element for controlling the light source to wavelength dither the output from the light source to produce a dither in the phase difference between the MZ arms, in turn which produces artificial fringes at the drifting output of the MZ.

Preferably the dither signal element dithers the phase difference between the MZ arms by at least 360°, to produce artificial fringes, so that the drifting output of the Mach Zehnder's operating point always displays its true fringe visibility.

The invention also provides a method of locating an event comprising the steps of:

launching light into a waveguide so that the light is caused to propagate in both directions along the waveguide to thereby provide counter-propagating optical signals in the waveguide, the waveguide being capable of having the counter-propagating optical signals or some characteristic of the signals modified or affected by an external parameter caused by the event, to provide modified counter-propagating optical signals which continue to propagate along the waveguide; substantially continuously and simultaneously monitoring the modified counter-propagating optical signals, so that when an event occurs, both of the modified counter-propagating optical signals affected by the external parameter are detected;

determining the time difference between the detection of the modified signals in order to determine the location of the event;

forming the waveguide as a Mach Zehnder interferometer having a first arm through which the counter-propagating optical signals travel, and a second arm through which the counter-propagating optical signals travel; and controlling the polarisation states of the counter-propagating optical signals input into the waveguide to provide amplitude and phase matched counter-propagating signals from the waveguide.

Preferably the polarisation states of the counter-propagating signals provide amplitude and phase-matched counter-propagating signals from the waveguide which achieve maximum output fringes. However, in other embodiments, the control of the polarisation states may be such that phase matched sub-maximum fringes are provided.

Preferably the step of controlling the polarisation states comprises randomly changing the input polarisation states of the counter-propagating signals whilst monitoring the counter-propagating optical signals output from the Mach Zehnder interferometer to detect a substantially zero state of intensities, or maximum state of intensities of the counter-propagating signals, and selecting the input polarisations which provide the substantially zero or substantially maximum intensities.

In one embodiment, fringes for determining the polarisation states are artificially created.

Preferably the artificially created fringes are created by dithering or modulating the wavelength of the light source and providing a path length mismatch between the first and second arms of the Mach Zehnder interferometer.

In one embodiment the step of controlling the polarisation states comprises controlling the polarisation controllers to thereby set the input polarisation state of the signals supplied from the light source to each input of the bidirectional Mach Zehnder interferometer to provide phase matched counter-propagating output signals.

Preferably the wavelength of the laser source is dithered by an amount which leads to the dithering of the phase difference between the MZ arms by 360°, to produce artificial fringes, so that with a drifting operating point, the Mach Zehnder's counter propagating outputs always display their true fringe visibility.

BRIEF DESCRIPTION OF THE DRAWINGS

Preferred embodiments will be described, by way of example, with reference to the accompanying drawings, in which.

DETAILED DESCRIPTION OF THE PREFERRED EMBODIMENTS

Figure 1:
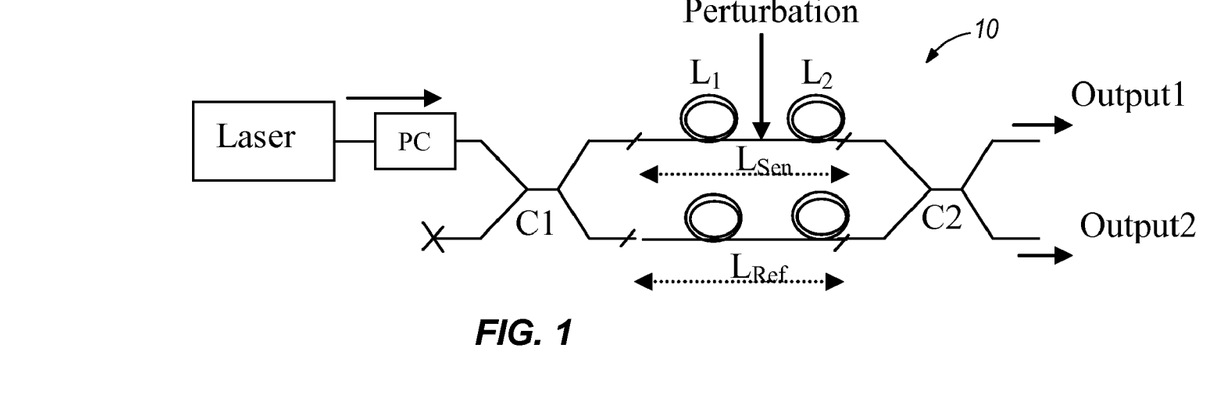
FIG. 1 is a diagram of a basic layout of a conventional uni-directional MZ system.

With reference to FIG. 1, both outputs of a conventional unidirectional MZ (shown in FIG. 3), which are complementary, will drift and vary in an approximately sinusoidal fashion with time due to environmental and other effects. The maximum possible amplitude, or fringe visibility, of the intensity of both MZ outputs can be related to the alignment of the polarisation states of the interfering signals in the MZ interferometer arms. It is possible to control the alignment of polarisation states of the interfering signals, and therefore the fringe visibility of a MZ, by controlling the polarisation of the light signal in the input lead fibre. In fact, there are two possible polarisation states at the input lead of the fibre MZ for which the fringe visibility of the outputs of a unidirectional MZ is at a maximum approaching unity. This is shown in FIG. 2 for a unidirectional MZ using a Poincare sphere to illustrate the maximum fringe input polarisation states.

Figure 2:
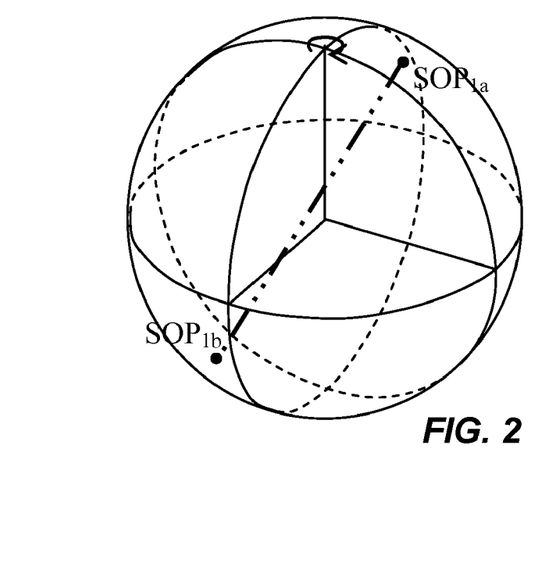
FIG. 2 is a Poincare sphere illustrating polarisation states which achieve maximum fringe visibility for a conventional unidirectional MZ.
Figure 3:
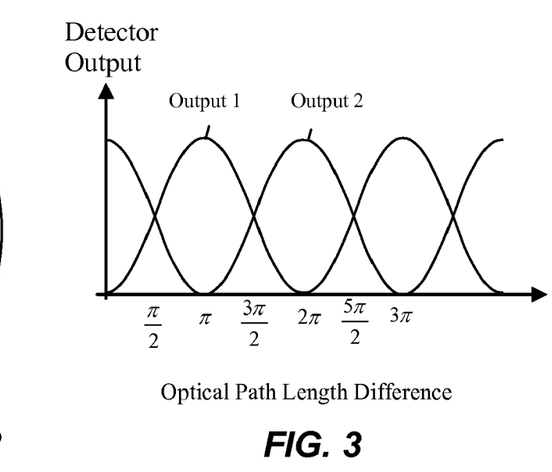
FIG. 3 is a diagram showing the outputs in FIG. 1 caused by the phase differences between the MZ arms.

As shown in FIG. 2, there exist two unique polarisation states at the input of the MZ 10, for which either output of the conventional unidirectional MZ will have a maximum fringe visibility. When plotted on the Poincare sphere, these two polarisation states are diametrically opposed.

Figure 4:
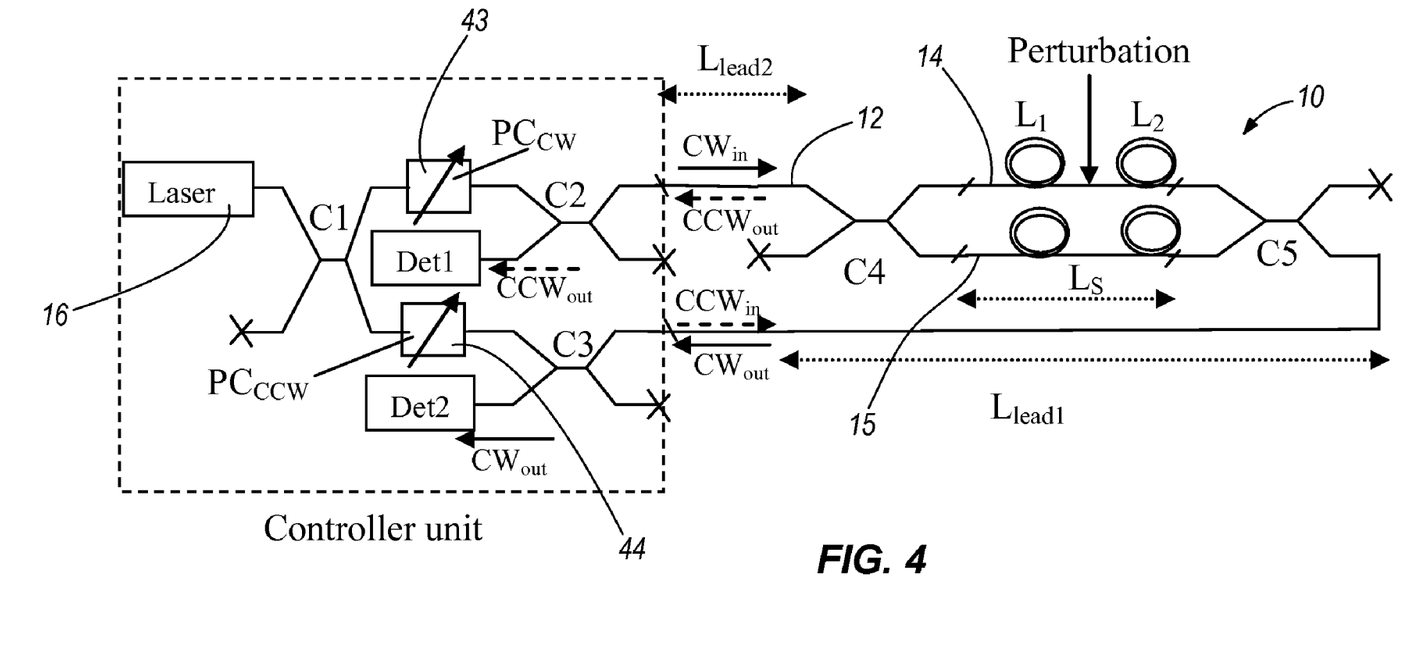
FIG. 4 is a diagram of a system according to preferred embodiments of the invention.

With reference to FIG. 4, the inventors have shown experimentally that the bidirectional MZ 10 can be treated as two separate unidirectional MZs, one for each direction of propagation. However, the two counter-propagating MZs are not completely independent, and do share an important polarisation related behaviour.

The counter propagating outputs of the bi-directional MZ will also drift and vary in the same fashion. For each direction, there will also be two input polarisation states for which the MZ outputs will achieve a maximum output fringe. Although the choice of either one of these input polarisation states achieves a maximum output fringe, and thus a maximum sensitivity for a conventional MZ, in the case of a bidirectional MZ used to locate events, the choice of input polarisation state for each direction carries an important significance. For this discussion, it will be assumed that only one MZ output for each direction is used ($CW_{out}$ and $CCW_{out}$)

Given that there are two possible input polarisation states for each direction which achieves maximum fringe visibility, then there are four possible pairings of counter-propagating input polarisation states which will simultaneously achieve maximum output fringe visibilities for both directions.

The bi-directional MZ 10 shown in FIG. 4 includes a coupler C4 to incorporate a fibre lead-in length 12 to the MZ sensor, $L_{lead2}$. This is one practical way to set up the system as it allows for encapsulation of the optoelectronics and associated optical components in one controller unit 20. Also included are two polarisation controllers, $PC_{cw}$ 43 and $PC_{cw}$ 44, which can be used to control the input polarisation state to the MZ 10 for the CW (clockwise) and CCW (counter-clockwise) directions, respectively. Controlling the input polarisation state in the lead fibre of a MZ can achieve maximum output fringes. This can be applied independently to both directions on the bidirectional MZ 10 in order to simultaneously achieve maximum output fringes for both directions. Various multiple-plate, voltage controlled polarisation controllers can be used to control the input polarisation state, and can include liquid crystal based polarisation controllers or piezo-based polarisation controllers.

Figure 5:
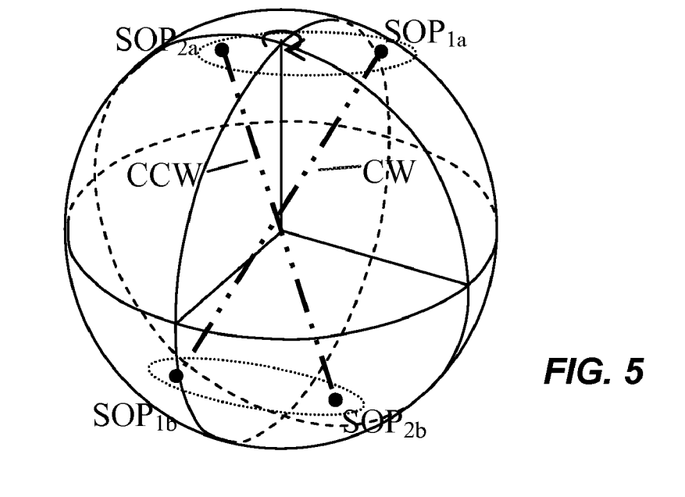
FIG. 5 is a Poincare sphere diagram relating to the embodiment of FIG. 4.

For the CW propagation direction there are the two possible input polarisation states which give maximum output fringes—$SOP_{1a}$ and $SOP_{1b}$. Equally, for the CCW propagation direction, the two possible input polarisation states which give maximum output fringes are $SOP_{2a}$ and $SOP_{2b}$. These polarisation states, can be represented on a Poincare sphere as shown in FIG. 5.

Although there are 4 possible pairings which will simultaneously lead to maximum fringes at both counter propagating outputs $CW_{out}$ and $CCW_{out}$ of the bidirectional MZ ($SOP_{1a}$ and $SOP_{2b}$, or $SOP_{1a}$ and $SOP_{2b}$, or $SOP_{1b}$ and $SOP_{2a}$, or $SOP_{1b}$ and $SOP_{2b}$), only two of these pairings will lead to the outputs that have both maximum fringe visibility and are exactly matched in phase.

For the example shown in FIG. 4, the phase matched maximum fringe counter-propagating input polarisation states are: ($SOP_{1a}$ and $SOP_{2a}$), and ($SOP_{1b}$ and $SOP_{2b}$). This is shown in the FIGS. 6A and 6B.

Figure 6A:
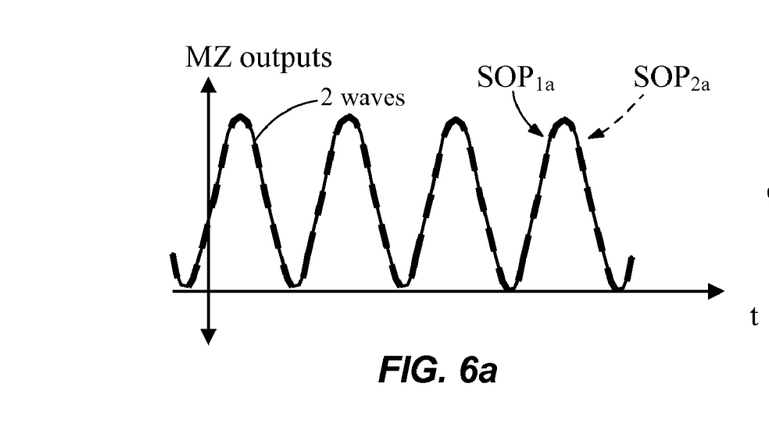
FIG. 6A and FIG. 6B are graphs showing maximum fringe visibility outputs according to the embodiment of FIG. 4.
Figure 6B:
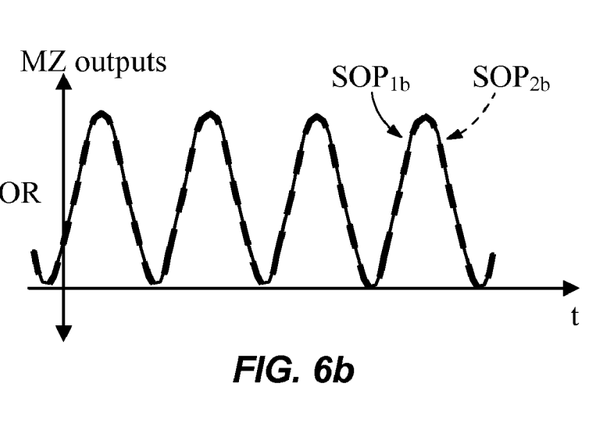

FIGS. 6A and 6B show two waves which are completely overlapped, namely $SOP_{1a}$ and $SOP_{2a}$ in FIG. 6A, and $SOP_{1b}$ and $SOP_{2b}$ in FIG. 6B.

This phase and amplitude matching condition is important for the Locator system, as it will allow for the most accurate location of events on the sensing cable to be determined. This means that it is essential that there is no time difference between the counter-propagating drifting MZ output signals when the MZ sensor is in the rest state (no disturbance). If the counter-propagating outputs are not matched in phase, then this will lead to the introduction of an error in the time difference calculation and thus the calculation of the location.

Figure 7A:
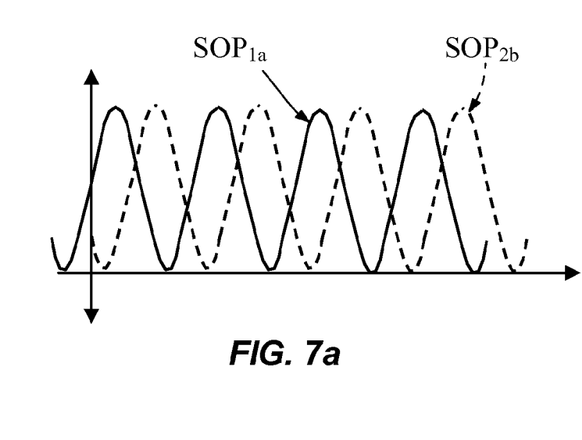
FIG. 7A and FIG. 7B are illustrative diagrams showing non-phase matched maximum fringe outputs.
Figure 7B:
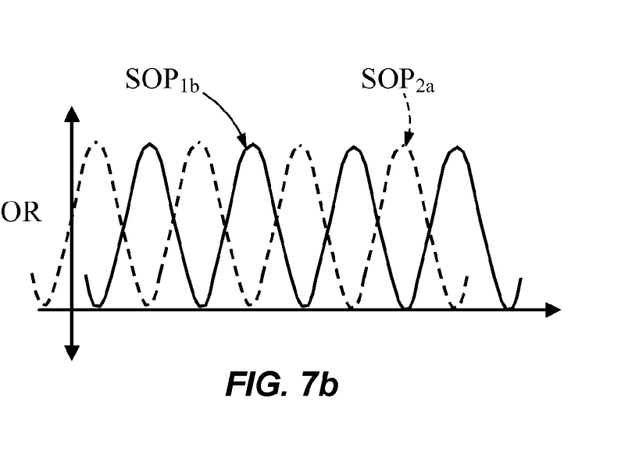

FIGS. 7A and 7B show the counter-propagating MZ outputs for the non phase matched maximum fringe counter-propagating input polarisation states, namely $SOP_{1a}$ and $SOP_{2b}$ in FIG. 7A, and $SOP_{1b}$ and $SOP_{2a}$ in FIG. 7B.

The achievement of counter-propagating, phase-matched maximum fringe outputs leads to two important results with respect to the system. It allows for accurate locating of events, as well as maximum sensitivity of the bi-directional MZ.

However, input polarisation states which lead to amplitude and phase matched counter-propagating outputs are not limited only to the input polarisation states which achieve maximum output fringes. There is also a plurality of other input polarisation state pairs which also lead to amplitude and phase matched outputs, but with sub-maximum fringe visibilities. For example, it is possible to adjust both polarisation controllers 43 and 44 such that the fringe visibility of both outputs is identical and less than the theoretical maximum of 100%, but phase matched. Although a reduction in fringe visibility will lead to a reduction in sensitivity of the bidirectional MZ 10, as long as the fringe visibility is kept relatively high (for example >75%), it is still possible for the system to calculate accurate locations whilst maintaining an acceptable level of sensitivity. The variation in fringe visibility of the MZ output for each direction in the bi-directional MZ can be plotted on a Poincare sphere to show the relationship between input polarisation states and MZ output fringe visibility. A typical response is shown in FIGS. 8 and 9.

Figure 8:
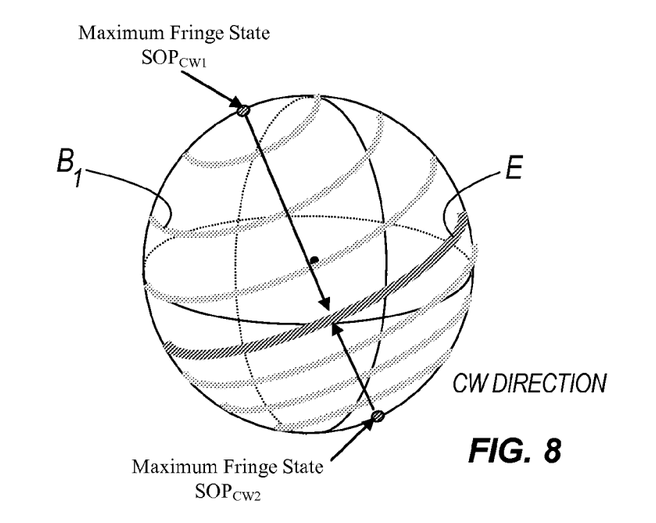
FIG. 8 is a Poincare sphere diagram illustrating various polarisation states of one counter-propagating signal to provide various fringe visibilities according to embodiments of the invention.
Figure 9:
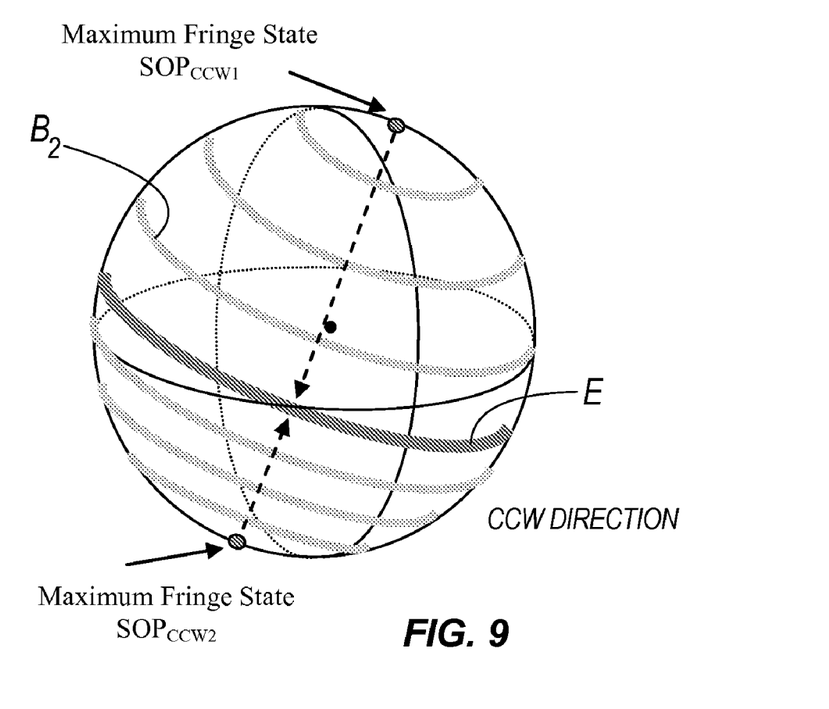
FIG. 9 is a diagram similar to FIG. 8 relating to the other counter-propagating signal.

The two unique input polarisation states which lead to a maximum fringe visibility form two opposite 'poles' on the sphere, $SOP_{cw1}$ and $SOP_{cw2}$ (FIG. 8). For non-maximum fringe visibilities, polarisation states of equal fringe visibility form latitudinal belts, with the equatorial belt E representing the polarisation states of minimum fringe visibility. Moving away from the poles, towards the equatorial belt, say $B_1$ and $B_2$, which is midway between the two poles, the fringe visibility decreases and becomes a minimum at the equatorial belt E. Both "hemispheres" are essentially mirror images of each other.

The position of opposing maximum fringe visibility poles, and therefore the latitudinal and equatorial belts, will vary according to the birefringence of the bi-directional MZ system, namely the input lead 12 and MZ arms 14 and 15 for the CW direction. This can be thought of as a rotation of the fringe visibility poles and latitudinal belts around the sphere. The minimum fringe visibility is not necessarily always zero, as would be expected in an ideal MZ 10, but can be non-zero.

The actual value of the minimum fringe visibility will also vary with the birefringence of the MZ system 10 for that direction. So in summary, a change in birefringence in the MZ system 10, which for the CW direction can include a change in the birefringence in the input lead length 12, and/or MZ sensor arms 14 and 15, can cause not only the fringe visibility poles and latitudinal belts to rotate for each direction, but can also change the range of fringe visibilities possible. Importantly, though, the maximum fringe visibility always approaches unity, irrespective of the birefringence of the MZ system.

Looking at the CCW direction of propagation (shown in FIG. 9) in the bi-directional MZ 10, a similar relationship between the fringe visibility of the MZ output 1, 2 and input polarisation states can be seen. The position of opposing maximum fringe visibility poles, and therefore the latitudinal and equatorial belts, will vary according to the birefringence of the bi-directional MZ system, which includes the input lead ($L_{lead1}$ and MZ arms 14 and 15. In fact, the minimum and maximum fringe visibility values are the same as for the CW direction for any given time, only the absolute position of the maximum fringe visibility states, $SOP_{ccw1}$ and $SOP_{ccw2}$ is different when compared with the CW direction.

The optical fibre cables that make up the apparatus of the preferred embodiments are actually installed in a variety of environments where they will be subjected to fluctuating and random conditions such as wind, rain, mechanical vibrations, stress and strain, and temperature variations. As mentioned earlier, these effects can vary the birefringence of the optical fibre in the cables, which in turn can change the fringe visibilities of both Locator MZ outputs through the polarisation induced fringe fading (PIFF) effect. So, in a realistic installation, where environmental factors will cause random birefringence changes along the fibres of the Locator system, the fringe visibilities of the respective MZ output intensities can vary randomly with time.

In the apparatus of the preferred embodiments, it is necessary to search and find the input polarisation states for the CW and CCW directions of the bidirectional MZ 10 which correspond to both MZ outputs having the same fringe visibility and being phase matched. One way this could be done is by monitoring the two Locator MZ outputs whilst scrambling the polarisation controllers. A number of scrambling algorithms could be used as long as they achieve the coverage of most of the possible input polarisation states in a relatively short time.

Once these input polarisation states are found, they need to be set to achieve amplitude and phase matched MZ output intensities. To keep the MZ outputs in the amplitude and phase matched condition, it is also necessary to continue adjusting the input polarisation states to compensate for any PIFF that may lead to non-matching counter propagating fringe visibilities, and therefore non-phase matched MZ outputs. This requires knowledge of the actual fringe visibility of the counter-propagating outputs of the bidirectional MZ.

For an apparatus which is using a CW laser as its source, it is not possible to continuously monitor the fringe visibilities of the two MZ outputs, especially in the absence of disturbances. This is because the time taken for the MZ output intensities to go through a full fringe amplitude excursion will vary with time and will be a function of the random phase fluctuations in both arms 14 and 15 of the MZ 10, as well as the PIFF due to the random birefringence changes in the fibres along the length of the bidirectional MZ system.

However, it is possible to determine that a maximum fringe state exists for either of the MZ output intensities if they move through or very close to a zero or maximum intensity level.

This is because the zero or maximum level intensities are unique to a maximum fringe visibility. So, for a bidirectional MZ system with polarisation controllers at the inputs of the bi-directional MZ, as shown in FIG. 4, one method for determining the required input polarisation states, which are associated with the phase matched maximum MZ output fringe visibilities, is to use a polarisation scrambling technique to randomly change the input polarisation state whilst simultaneously monitoring the MZ outputs. When the MZ output intensities reach a zero (or near-zero), or maximum level, then the corresponding input polarisations can be used to set the MZ output intensities to maximum fringe visibilities.

Given that there are 2 possible input polarisation states that simultaneously give a maximum fringe visibility for each direction in the bidirectional MZ, and that only two out of the 4 possible pairings of counter-propagating input polarisation states will give phase matched MZ outputs, it is necessary to check that the chosen two polarisation states yield phase matched MZ outputs. This can be done by simply monitoring the MZ outputs for a predetermined time. If they are not in phase, then polarisation scrambling can be used to find two input polarisation states, and their corresponding maximum fringe outputs, to continue to search for phase matching.

Once the phase matched maximum fringe states are found and set, a tracking algorithm can be used to continue to keep the MZ outputs in a phase matched condition by adjusting the voltage drives to the individual plates of both polarisation controllers accordingly.

Figure 14:
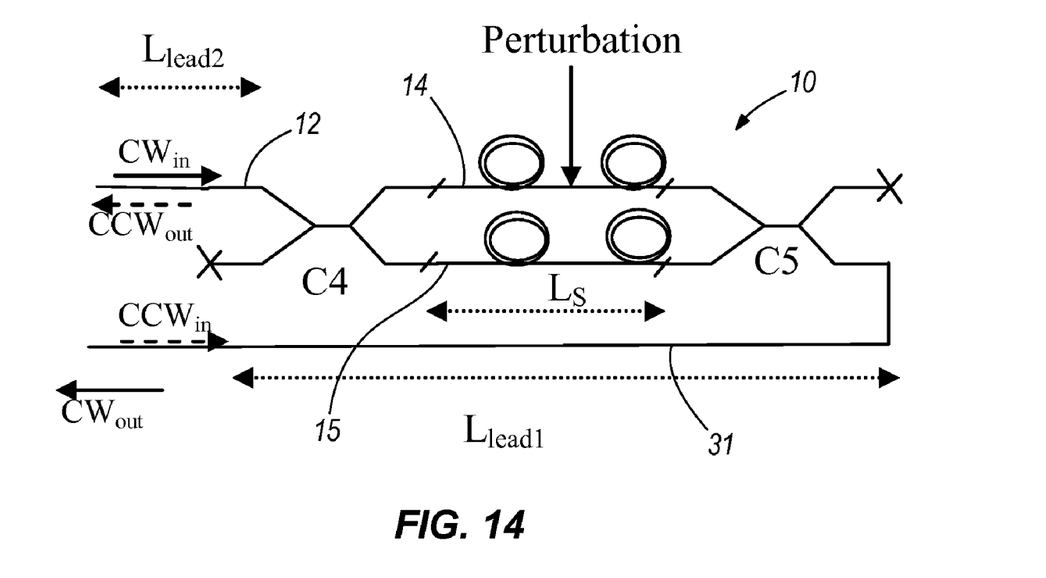
FIG. 14 is a diagram of a typical Mach Zehnder interferometer used in the preferred embodiments.

This technique will be described in detail with reference to FIGS. 14 and 15. One of the drawbacks of using this technique is that even though we are continuously monitoring the MZ outputs, we are not continuously monitoring the output fringe visibilities of the MZ outputs. To detect a maximum fringe, it is necessary to wait until the MZ output intensity goes to, or very near, a zero or maximum intensity level. Since the MZ outputs will randomly vary in speed and amplitude, the time taken for which a maximum output fringe can be detected for either of the MZ outputs will vary. Another draw back is that if the MZ output is at a maximum fringe state but is not at a zero or maximum intensity level, it is not possible to detect this situation using only this technique.

A more direct technique would involve continuously monitoring the fringe visibilities of the MZ outputs. This requires that fringes are created artificially in the system.

Fringes can be artificially created in the MZ 10 by using a transducer in one of the sensing arms to modulate the phase of the light propagating through the fibre. However, for an event location system where it is preferable that the sensing cables are totally passive, this is not a practical solution.

Another technique for stimulating fringes in a fibre MZ is to modulate or dither the wavelength of the laser source 16. As long as there is a path length mismatch between the MZ arms 14 and 15, then the modulation in optical wavelength (which can also be expressed as an optical frequency) will lead to the creation of fringes. This comes about due to the wavelength dependent phase difference between the MZ arms caused by the path length mismatch. For a Mach Zehnder 10 with a path length mismatch $\Delta L$, the phase difference $\Delta \phi$ between the arms can be expressed by:

$$\Delta \phi = \frac{2\pi \cdot n_{co} \cdot \Delta L \cdot \Delta v}{c}$$

where $n_{co}$ is the refractive index of the fibre core, c is the speed of light in a vacuum, and $\Delta v$ is the laser's optical frequency change. In the case of a bidirectional MZ, as is described in FIG. 4, the phase difference $\Delta \phi$ between the arms of the MZ will be the same for each direction of propagation. It should be noted that the phase difference referred to here is additional to the phase difference between the arms which is induced by a perturbation event on the MZ sensor.

For a MZ whose operating point is at quadrature, a full fringe excursion can be achieved for a given path length mismatch by modulating the laser source's frequency/wavelength by an amount which results in $\Delta \phi = \pi^c$. For a typical fibre core index $n_{co}=1.46$, a path length mismatch $\Delta L=1$ m, and a full fringe $\Delta \phi = \pi^c$, will give an optical frequency dither of $$\Delta v = \frac{c \cdot \Delta \phi}{2\pi \cdot n_{co} \cdot \Delta L} = \frac{3 \times 10^8 \cdot \pi}{2\pi \cdot 1.46 \cdot 1} = 102.75 \text{ MHz}$$

For a centre wavelength of 1550 nm, this corresponds to a wavelength dither of ~0.8 μm.

One of the simplest ways to modulate the wavelength of a standard laser diode is to modulate the drive current to the laser. These types of lasers however do not normally have a high enough coherence to be suitable for the applications discussed herein.

The pumped fibre laser source 16 requires a mechanical modulation of the fibre laser's cavity, or fibre Bragg gratings to achieve wavelength modulation. This can be achieved by using either a temperature tuning approach, or a mechanical piezo tuning approach using a piezo transducer (PZT). Since temperature tuning is very slow, the piezo tuning method is more suited to such a laser in order to achieve the wavelength dithering or modulation.

Figure 11:
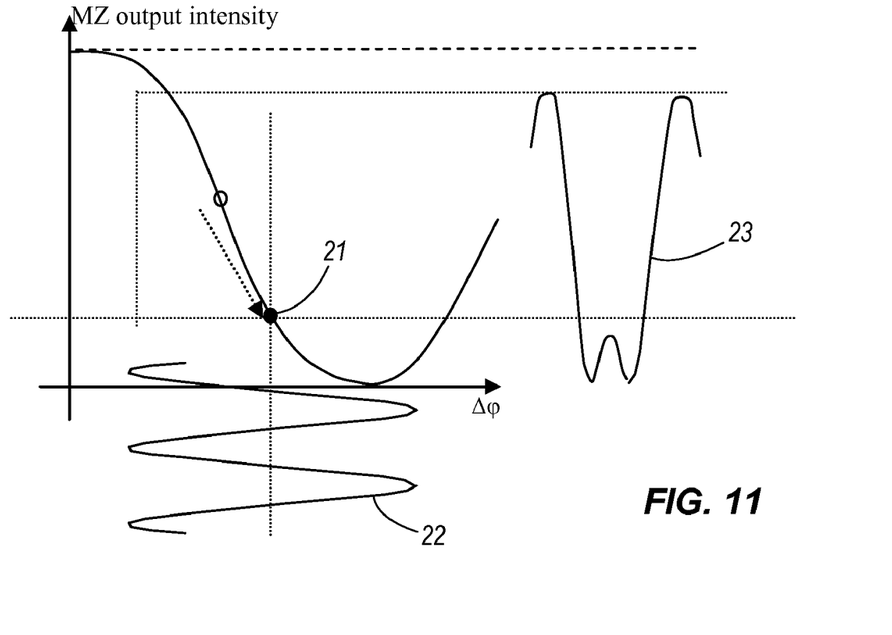
FIG. 11 is a graph showing the effect of a drifting operating point in the MZ output, which drifts in and out of quadrature, on the stimulated fringes produced by the Mach Zehnder interferometer.

In order to use the dithering of the laser wavelength to continuously monitor the fringe visibility of the MZ, it is necessary to create at least 2 full artificial fringes per cycle of PZT modulation. This requirement is determined by the fact that, as mentioned earlier, the operating point of the MZ drifts in and out of quadrature with time, and the creation of only one full fringe, that is, $\Delta \phi = 180°$, would not be sufficient to continuously show the true fringe visibility. This is illustrated in FIG. 11.

Figure 10:
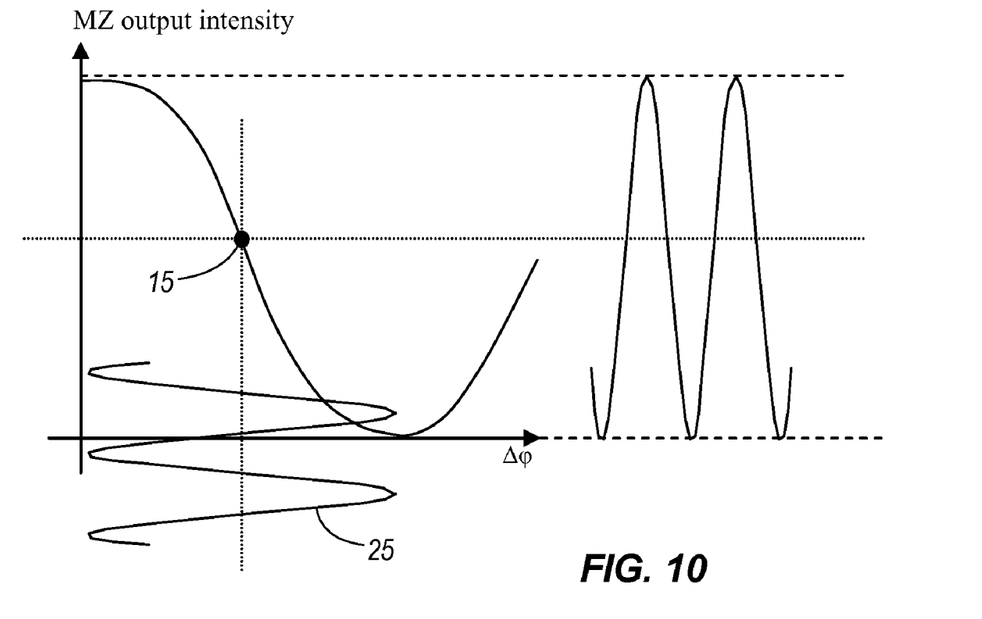
FIG. 10 is a graph showing the effect of wavelength dither of the light source on the output of the MZ used in one embodiment of the invention.

FIG. 10 shows that for a static MZ output operating point which is exactly at quadrature, applying a sinusoidal phase ($\Delta \phi$) modulation with an 180° excursion will lead to a full fringe per cycle of phase modulation. In other words, the fringe visibility can be continuously monitored. It should be noted that since the transfer function of the MZ is a raised cosine and it is being modulated about the quadrature point with a sinusoidal signal, the resulting stimulated fringes will additionally contain harmonics of the fundamental modulating frequency.

However, in a real MZ 10, the MZ's output operating point drifts in and out of quadrature. This is illustrated in FIG. 11.

Figure 12:
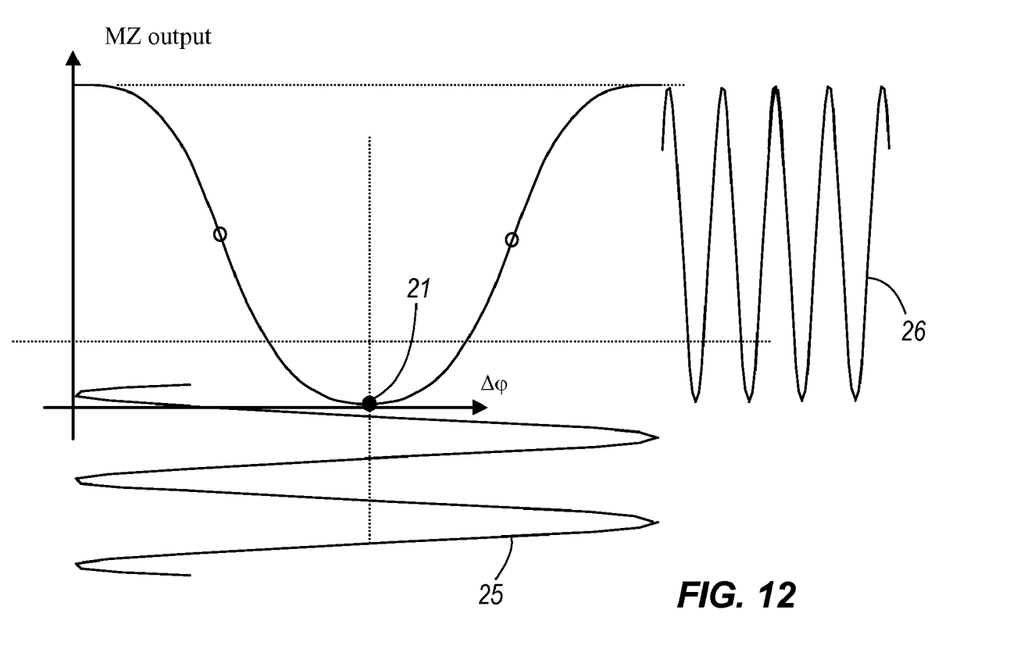
FIG. 12 is a diagram similar to FIG. 11 but showing a 360° dither of the phase difference between the MZ arms for a drifting MZ output.

If, however, the dithering is used to achieve at least 360° of phase modulation at all times, the true fringe visibility of the stimulated fringes can be continuously monitored, irrespective of the drift of the MZ output's operating point. This is illustrated in FIG. 12.

If a 360° phase modulation (or more) is used, that is 2 fringes per cycle of modulation are stimulated, this will ensure that the true fringe visibility will always be measurable, irrespective of the drift in the MZ output. This will essentially produce higher harmonics in the stimulated fringes. As the MZ output operating point drifts to the left or the right of quadrature, it will cause higher harmonics of the dither frequency ($2^{nd}$, $3^{rd}$, $4^{th}$, etc.) together with the fundamental dither frequency to be present in the stimulated fringes.

To make sure that the stimulated fringes do not interfere with the fringes created by the events which are to be sensed by the apparatus, it is important for the frequency of the stimulated fringes to be in a frequency range well outside that of the event signals detected by the apparatus. For example, in a typical installation, where the frequency range of interest may be 0-20 kHz, the fundamental frequency of the stimulated fringes should be higher, e.g. 50 kHz.

FIG. 11 shows that with the drifting MZ output operating point 21 and the phase dither 22 shown in FIG. 11, a stimulated full range fringe 23 will not be achieved due to the drifting. FIG. 12 shows that by using a full 360° dither 25, true fringe visibility 26 is always present in stimulated fringes, irrespective of the drifting operating point 21. There will also be frequency doubling for the 360° phase modulation for this case. In FIG. 10, the static operating point 15 which is at quadrature and the phase dither 25 always produces the stimulated full fringe 26 shown in FIG. 10. In FIGS. 10 to 12, the phase dither is at a frequency of about 40 kHz. The frequency of the fringes 26 in FIG. 10 is 40 kHz. In FIG. 11 the onset of frequency doubling can be seen in 23, whilst the output fringes in FIG. 12 will include even harmonics of the fundamental frequency, not excluding the fundamental dither frequency. Generally speaking, the output fringes will include a proportion of odd and even harmonics of the fundamental dither frequency. The amplitude of the odd and even harmonic frequencies at any given time will depend on exactly where the drifting MZ output's operating point is at any given time.

Figure 13:
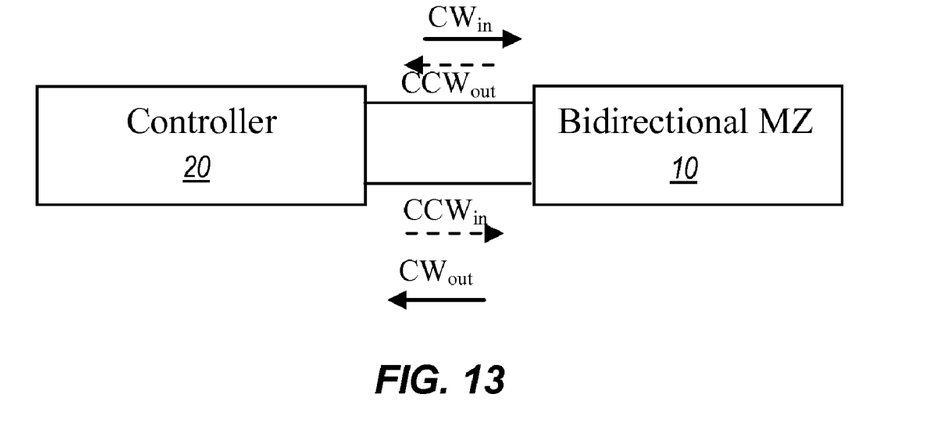
FIG. 13 is a block diagram of a first embodiment of the invention.

FIG. 13 is a schematic block diagram of a first embodiment of the invention in which the controller 20 is separated from the Mach Zehnder interferometer which forms the sensing system of the various embodiments. FIG. 14 shows the bi-directional MZ 10 and includes the lead-in fibre 12 as previously described. The lead-in fibre connects with a coupler C4 so that a first signal is launched into arm 14 of the Mach Zehnder 10 and a second signal is launched into arm 15 of the Mach Zehnder 10. The Mach Zehnder interferometer 10 has a sensing length of $L_s$ which may typically be several or more kilometers. The arms 14 and 15 are connected to a further coupler C5 so that the signal launched into the arms 14 and 15, whose signals recombine at C5, is received in fibre 31 as an output signal CW out. Simultaneously, a counter-propagating signal is received in the fibre 31 which in turn travels to coupler C5 and then launches into arms 14 and 15 so that the two signals recombine at C4 and exit coupler C4 at lead-in line 12. Thus, counter-propagating signals are received in both arms 14 and 15. The output propagating signal received in fibre 12 passes through coupler C2 to a first detector 40 and the other counter-propagating signal passes through the fibre 31 and through a coupler C3 to a second detector 50. Thus, if there is a perturbation, as shown in FIG. 14, at part of the sensing length $L_s$ of the Mach Zehnder 10, then modified counter-propagating signals continue to propagate through the sensing arms 14 and 15 back to the respective detectors 40 and 50. The time difference between receipt of the modified counter-propagating signals are provided from the detectors 40 and 50 to output monitor 60 and then to processor 62 which form the detecting unit of the preferred embodiment so that the event can be recognised and the event location determined by the time difference between receipt of the modified counter-propagating signals detected by the detectors 40 and 50.

Figure 15:
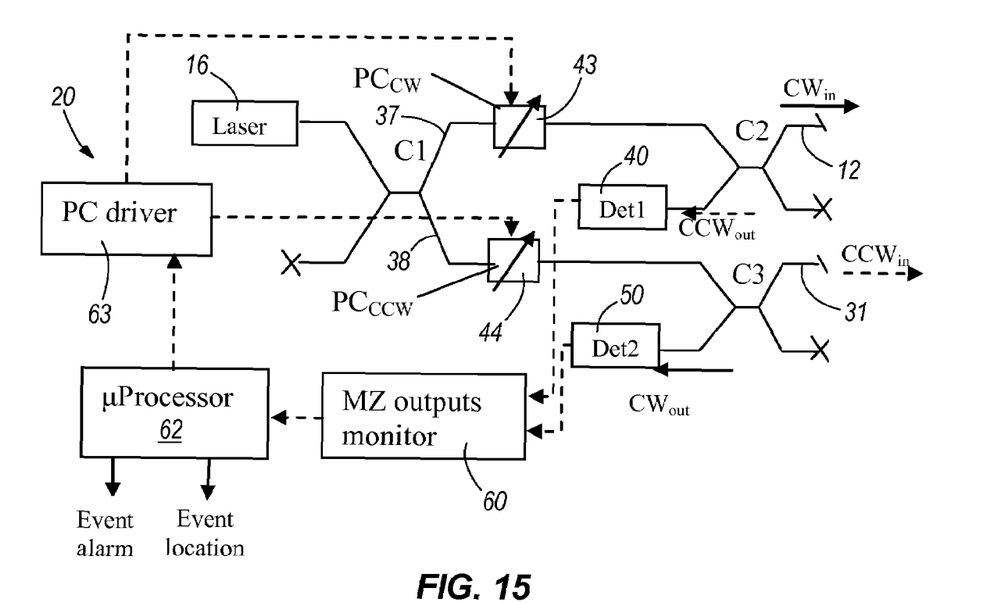
FIG. 15 is a diagram showing the controller of the embodiment of FIG. 13.

As is shown in FIG. 15, the controller 20 includes the wholly coherent laser 16 which produces a light output signal which is split into two by coupler C1. The split signals are then passed to polarisation controllers $PC_{cw}$ and $PC_{ccw}$ via fibres 37 and 38. The polarisation controllers are respectively connected to couplers C2 and C3 so that the counter-propagating signals are launched into the Mach Zehnder interferometer 10 as previously described. The polarisation controllers control the input polarisation states of the signals which are input into the arms 14 and 15.

To find the input polarisation states which produce matched outputs at the detectors 40 and 50, the polarisation controllers 43 and 44 can be scrambled to randomly change the input polarisation states such that as many different states as possible are covered in as short a time as possible. By continuously monitoring the outputs at the detectors 40 and 50, the polarisation states corresponding to the outputs passing a zero or near zero level, or maximum are stored in the microprocessor 62. When the output reaches a zero or maximum level, the corresponding input polarisation state is considered to be such that it achieves a maximum fringe visibility for that output. When a suitable number of input polarisation states are stored, the scrambling is stopped. The outputs from the arms 14 and 15 and received by the detectors 40 and 50 are then compared for combinations of input polarisation states and the degree of phase matching between the counter-propagating outputs is determined. When the degree of phase matching is above a predetermined acceptable level, the corresponding input polarisation states for which the degree of phase matching was acceptable are set to maintain the phase matched outputs detected by the detectors 40 and 50. If an acceptable degree of phase matching is not reached, the scrambling and comparing procedure described above is repeated again until acceptable degrees of phase matching is achieved.

The polarisation controllers 43 and 44 are driven by PC driver 60 so as to continuously change the polarisation of the signals in the fibres 37 and 38 and therefore provided to the couplers C2 and C3 as the counter-propagating inputs to the arms 14 and 15.

When the required input polarisation states which achieve phase matched maximum fringe visibility at the outputs detected by the detectors 40 and 50 are found, these required input polarisation states are set and the outputs detected by the detectors 40 and 50 are continuously monitored and the micro-processor 62 adjusts the polarisation controllers via the PC driver 63 to maintain the phase matched condition.

The output monitor 60 determines an event by passing the signals detected by the detectors 40 and 50 through a band pass filter having for example a bandwidth of from 1 kHz to 20 kHz (which is the expected frequency of an actual event or perturbation to the apparatus which needs to be detected). The arrival of modified propagating signals within this bandwidth and the time difference between receipt of the counter-propagating signals enables the event to be recognised and also the location of the event to be determined.

Thus, the band pass filtered signals are provided from the monitor 60 to the processor 62 for determining the location of the event.

In order to set the polarisation states, the complete output signal from the detectors 40 and 50 relating to both counter-propagating signals is received at the monitor 60. This is essentially the raw signal from both detectors 40 and 50 and that signal is low pass filtered and used to search for maximum fringes during the polarisation scrambling by detecting zero or maximum intensity levels. When the maximum fringes have been located, the processor 62 also checks for phase alignment. When the desired polarisation states are controlled, these are continuously fed to the PC driver and in turn, the PC driver drives the polarisation controllers 43 and 44 to maintain those polarisation states during use of the system. Monitoring can be performed continuously or intermittently to ensure that the required polarisation states are maintained.

Figure 16:
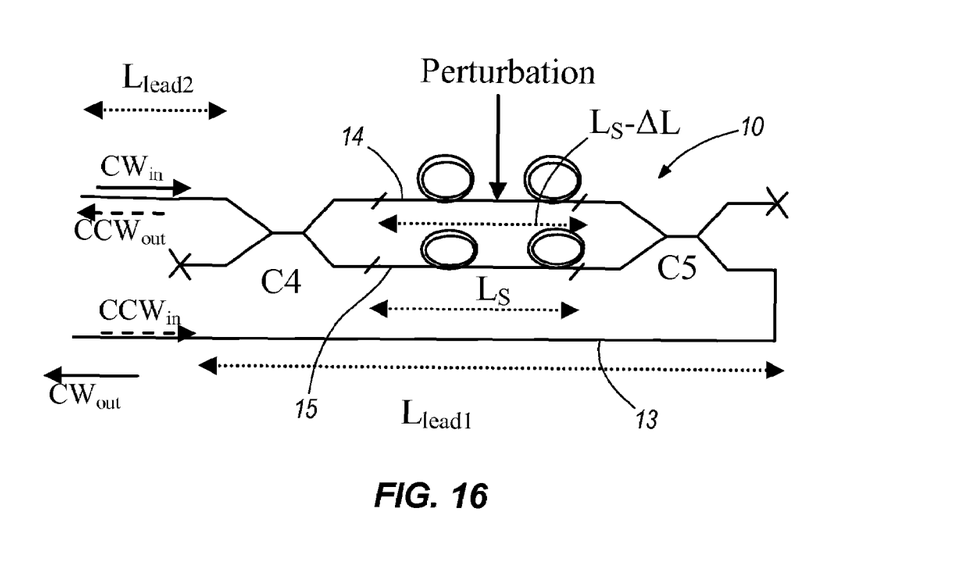
FIG. 16 is a schematic view of a second embodiment of the invention.

FIG. 16 shows a second embodiment of the invention. This embodiment is similar to that shown in FIG. 14, except the Mach Zehnder interferometer 10 has a path length mismatch of ΔL between the arms 14 and 15 so that one of the arms 14 has a length $L_s-\Delta L$ and the arm 15 has a length $L_s$. The path length mismatch is required to achieve stimulation of artificial fringes by dithering the wavelength of the laser source 16. One input of the coupler C4 is used as the clockwise input to the Mach Zehnder 10 and the other input of the coupler C4 is not used as in the earlier embodiment. Similarly, one of the inputs of the coupler C5 is connected to fibre 13 and provides the input for the counter-propagating signal and the other arm of the coupler C5 is also not used.

Figure 17:
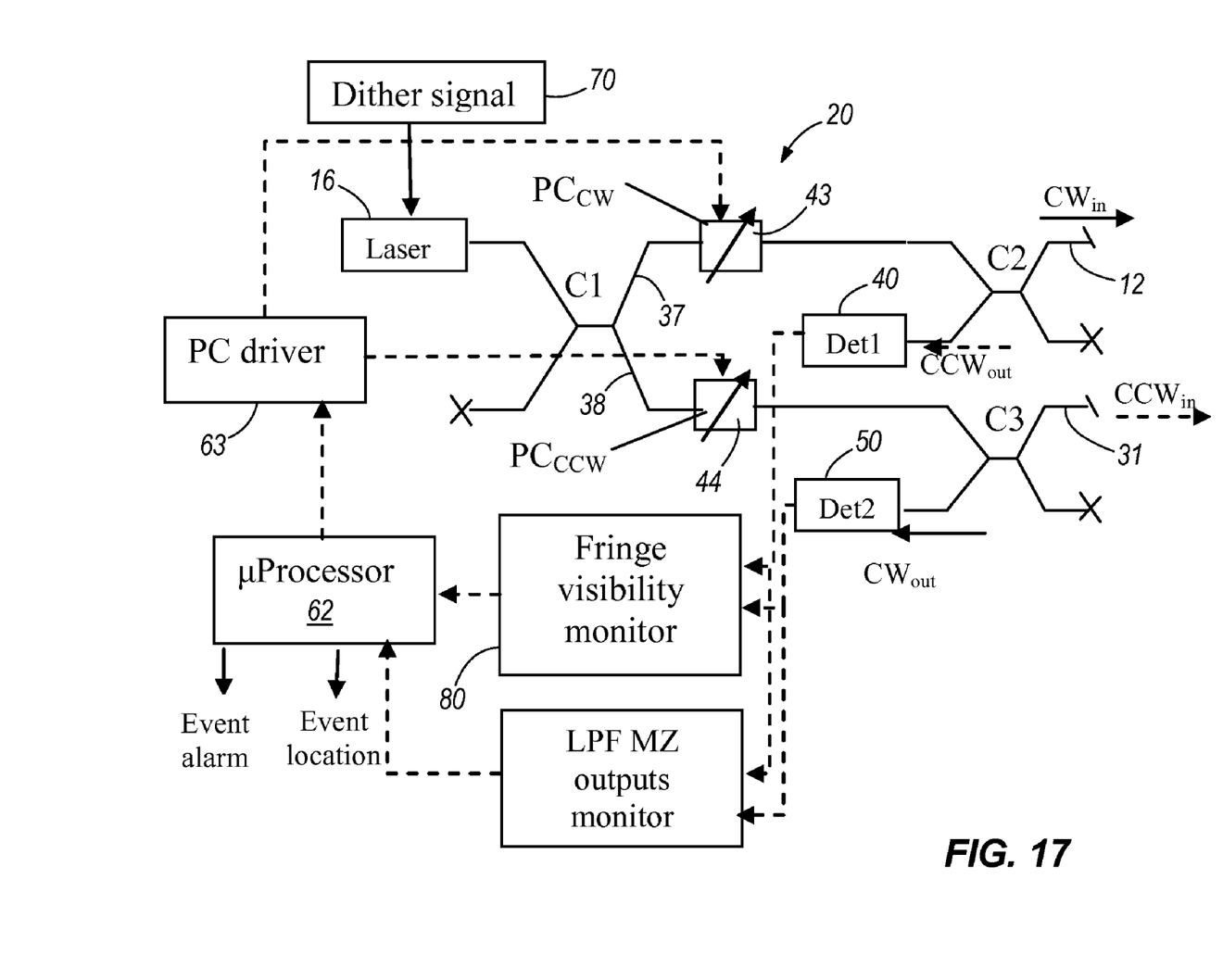
FIG. 17 is a block diagram of the controller of the embodiment of FIG. 16.

FIG. 17 is a view of the controller 20 according to this embodiment of the invention in which like reference numerals indicate like components to those described with reference to FIG. 15.

In this embodiment the laser 16 is a diode pumped bragg grating base doped fibre laser. To dither the wavelength of the laser 16, a piezoelectric transducer (not shown) is used, for example, on the internal bragg gratings in the fibre laser to modulate the output wavelength of the laser 16.

To create the artificial fringes, a dither signal which has a frequency above the event frequency of the perturbations which are expected to be provided to the Mach Zehnder 10 and sensed by the Mach Zehnder 10 is applied to the laser 16 from dither signal source 70. This dithers the wavelength of the laser and effectively creates fringes whose frequency consists of the dither frequency and harmonics of the dither frequency (as has been described in detail with reference to FIGS. 10 to 12).

By using the suitable path length mismatch ΔL previously described and adjusting the amplitude of the dithering, continuous fringes are created at the outputs of the Mach Zehnder 10 and which are supplied to the detectors 40 and 50. The outputs which are received by the detectors 40 and 50 will be composed of the dither frequency as well as harmonics of the dither frequency. A fringe visibility monitor 80 is connected to the detectors 40 and 50 for detecting the artificial fringes and determining the fringe visibility for each direction. The frequency range of the artificial fringes is above the event signal frequency range caused by a perturbation. Microprocessor 62 uses a suitable control algorithm, such as a simulated annealing control algorithm, to search and adjust the input polarisation controllers $PC_{cw}$ and $PC_{ccw}$ via driver 60 so that the stimulated artificial fringes are at a maximum visibility. The phase matching between the stimulated fringes is also detected by the microprocessor 62 and again, once a suitable input polarisation state from each of the controllers is achieved, that polarisation state is set. A control algorithm is used to adjust the input polarisation controllers $PC_{cw}$ and $PC_{ccw}$ to counteract any PIFF, so that the phase matched maximum fringe visibility condition is maintained.

Figure 18:
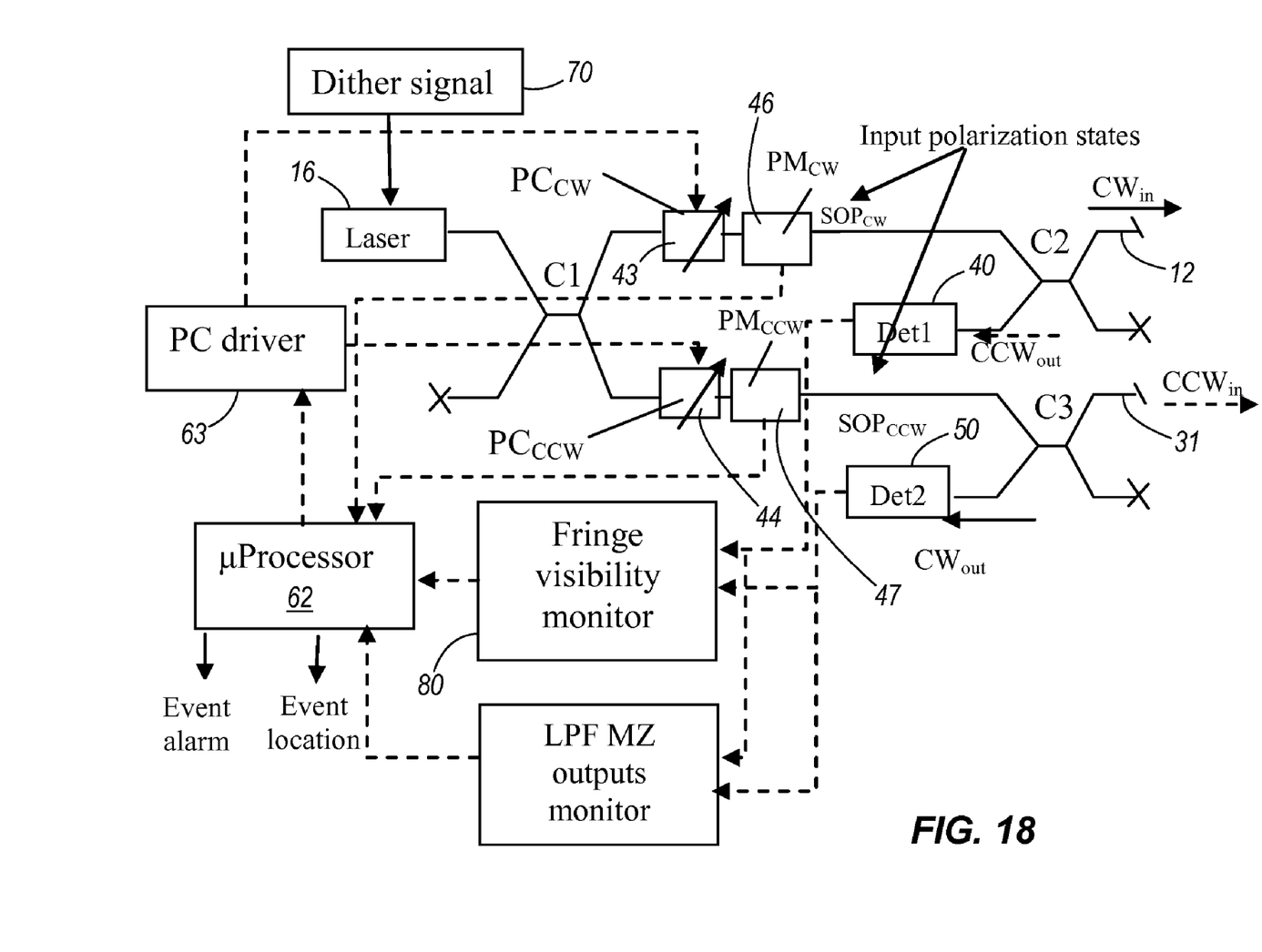
FIG. 18 is a block diagram of a third embodiment of the invention.

FIG. 18 shows a still further embodiment of the invention. Once again, like reference numerals indicate like parts to those previously described. The embodiment of FIG. 18 is a modification to the embodiment of FIG. 17 previously described. Once again, the output wavelength of the laser 16 is dithered in the manner described above. Once again, the input polarisation states of the counter-propagating signals supplied to the fibres 12 and 31 are controlled by polarisation controllers 43 and 44 respectively. The controllers 43 and 44 are connected to polarimeters 46 and 47 which respectively measure the polarisation state of the outputs from the polarisation controllers 43 and 44. The input light signals having the polarisation states are then supplied to the fibres 12 and 31 via the couplers C2 and C3 in the same manner as previously described. The polarimeters 46 and 47 allow the fringe visibility of the outputs from the controllers 43 and 44 to be related to their respective input polarisation states. The polarimeters 46 and 47 also allow for the capability of moving from one input polarisation state to another for both directions of propagation in a deterministic way, should that be desired. This essentially allows the implementation of a polarisation control strategy which can quickly identify where on the sphere the current input polarisation state is with respect to the two maximum fringe visibility SOP states for each direction of propagation, as well as how to change the polarisation controllers such that it is possible to find and maintain the input polarisation states $SOP_{cw}$ and $SOP_{ccw}$ which produce phase-matched bi-directional outputs from the Mach Zehnder 10 labelled $CW_{out}$ and $CCW_{out}$ in the drawings.

Since modifications within the spirit and scope of the invention may readily be effected by persons skilled within the art, it is to be understood that this invention is not limited to the particular embodiment described by way of example hereinabove.

In the claims which follow and in the preceding description of the invention, except where the context requires otherwise due to express language or necessary implication, the word "comprise", or variations such as "comprises" or "comprising", is used in an inclusive sense, i.e. to specify the presence of the stated features but not to preclude the presence or addition of further features in various embodiments of the invention.

What is claimed is:

1. An apparatus for locating the position of an event, comprising:

a light source;

a waveguide for receiving light from the light source so that the light is caused to propagate in both directions along the waveguide to thereby provide counter-propagating optical signals in the waveguide, the waveguide being capable of having the counter-propagating optical signals or some characteristic of the signals modified or affected by an external parameter caused by or indicative of the event to provide modified counter-propagating optical signals which continue to propagate along the waveguide;

detector means for detecting the modified counter-propagating optical signals affected by the parameter and for determining the time difference between the receipt of the modified counter-propagating optical signals in order to determine the location of the event; and a controller for controlling polarisation states of the counter-propagating optical signals so that the signals are amplitude and phase matched, wherein the waveguide comprises a first arm for receiving the counter-propagating signals, and a second arm for receiving the counter-propagating signals, the first and second arms forming a Mach Zehnder interferometer, and the first arm being of different length than the second arm so that the first and second arms have a length mismatch, the controller further comprising a dither signal producing element to wavelength dither the light from the light source.

2. The apparatus of claim 1 wherein the input polarisation states of the counter-propagating signals are controlled to achieve maximum output fringes at an output of the Mach Zehnder interferometer.

3. The apparatus of claim 1 wherein the controller comprises the detector means, a polarisation controller for each of the counter-propagating signals and the light source.

4. The apparatus of claim 3 wherein the controller includes a processor coupled to a polarisation control driver, and the polarisation control driver is coupled to the polarisation controllers for controlling the controllers to thereby set the polarisation of the signals supplied from the light source to the first and second arms of the Mach Zehnder interferometer to in turn set the polarisation of the counter-propagating signals.

5. The apparatus of claim 1 wherein the detector means comprises a first detector for one of the counter-propagating signals and a second detector for the other of the counter-propagating signals.

6. The apparatus of claim 5 wherein the controller includes a processor for receiving outputs from the detectors and for processing the outputs to indicate an event and to determine the location of the event.

7. The apparatus of claim 1 wherein the light source comprises a laser light source having bragg gratings and an adjuster for controlling at least one of the bragg gratings and a laser cavity of the laser light source to thereby alter the wavelength of the light signal output from the laser light source for producing the counter-propagating signals.

8. The apparatus of claim 1 wherein the detector means is connected to a Mach Zehnder output monitor for monitoring the counter-propagating signals detected by the detector means so that when the modified counter-propagating signals are detected by the detector means, the Mach Zehnder output monitor provides signals to a processor to determine the location of the event.

9. The apparatus of claim 1 wherein the dither signal producing element dithers the phase difference between the Mach Zehnder arms by at least 360°.

10. A method of locating an event comprising the steps of:
launching light into a waveguide so that the light is caused to propagate in both directions along the waveguide to thereby provide counter-propagating optical signals in the waveguide, the waveguide being capable of having the counter-propagating optical signals or some characteristic of the signals modified or affected by an external parameter caused by the event, to provide modified counter-propagating optical signals which continue to propagate along the waveguide;
substantially continuously and simultaneously monitoring the modified counter-propagating optical signals, so that when an event occurs, both of the modified counter-propagating optical signals affected by the external parameter are detected;
determining the time difference between the detection of the modified signals in order to determine the location of the event;
forming the waveguide as a Mach Zehnder interferometer having a first arm through which the counter-propagating optical signals travel, and a second arm through which the counter-propagating optical signals travel, wherein the first and second arms of the Mach Zehnder interferometer have a path length mismatch;
controlling the polarisation states of the counter-propagating optical signals input into the waveguide to provide amplitude and phase matched counter-propagating signals from the waveguide; and
dithering the wavelength of the launched light.

11. The method of claim 10 wherein the polarisation states of the counter-propagating signals provide amplitude and phase-matched counter-propagating signals from the waveguide which achieve maximum output fringes.

12. The method of claim 10 wherein the step of controlling the polarisation states comprises randomly changing the input polarisation states of the counter-propagating signals whilst monitoring the counter-propagating optical signals output from the Mach Zehnder interferometer to detect a substantially zero state of intensities, or maximum state of intensities of the counter-propagating signals, and selecting the input polarisations which provide the substantially zero or substantially maximum intensities.

13. The method of claim 10 wherein the step of controlling the polarisation states comprises controlling at least one polarisation controller to set the input polarisation state of signals supplied from a light source to each input of the Mach Zehnder interferometer to provide phase matched counter-propagating output signals.

14. A method of locating an event comprising the steps of:
launching light into a waveguide so that the light is caused to propagate in both directions along the waveguide to thereby provide counter-propagating optical signals in the waveguide, the waveguide being capable of having the counter-propagating optical signals or some characteristic of the signals modified or affected by an external parameter caused by the event, to provide modified counter-propagating optical signals which continue to propagate along the waveguide;
substantially continuously and simultaneously monitoring the modified counter-propagating optical signals, so that when an event occurs, both of the modified counter-propagating optical signals affected by the external parameter are detected;
determining the time difference between the detection of the modified signals in order to determine the location of the event;
forming the waveguide as a Mach Zehnder interferometer having a first arm through which the counter-propagating optical signals travel, and a second arm through which the counter-propagating optical signals travel;
controlling the polarisation states of the counter-propagating optical signals input into the waveguide to provide amplitude and phase matched counter-propagating signals from the waveguide; and
dithering the wavelength of the launched light by an amount which leads to the dithering of a phase difference between the Mach Zehnder arms by 360°.

* * * * *